Dec. 23, 1930.  R. C. BENNER ET AL  1,786,328
COMPOSITE SEPARATOR AND PROCESS OF MAKING THE SAME
Filed Sept. 8, 1923  2 Sheets-Sheet 1
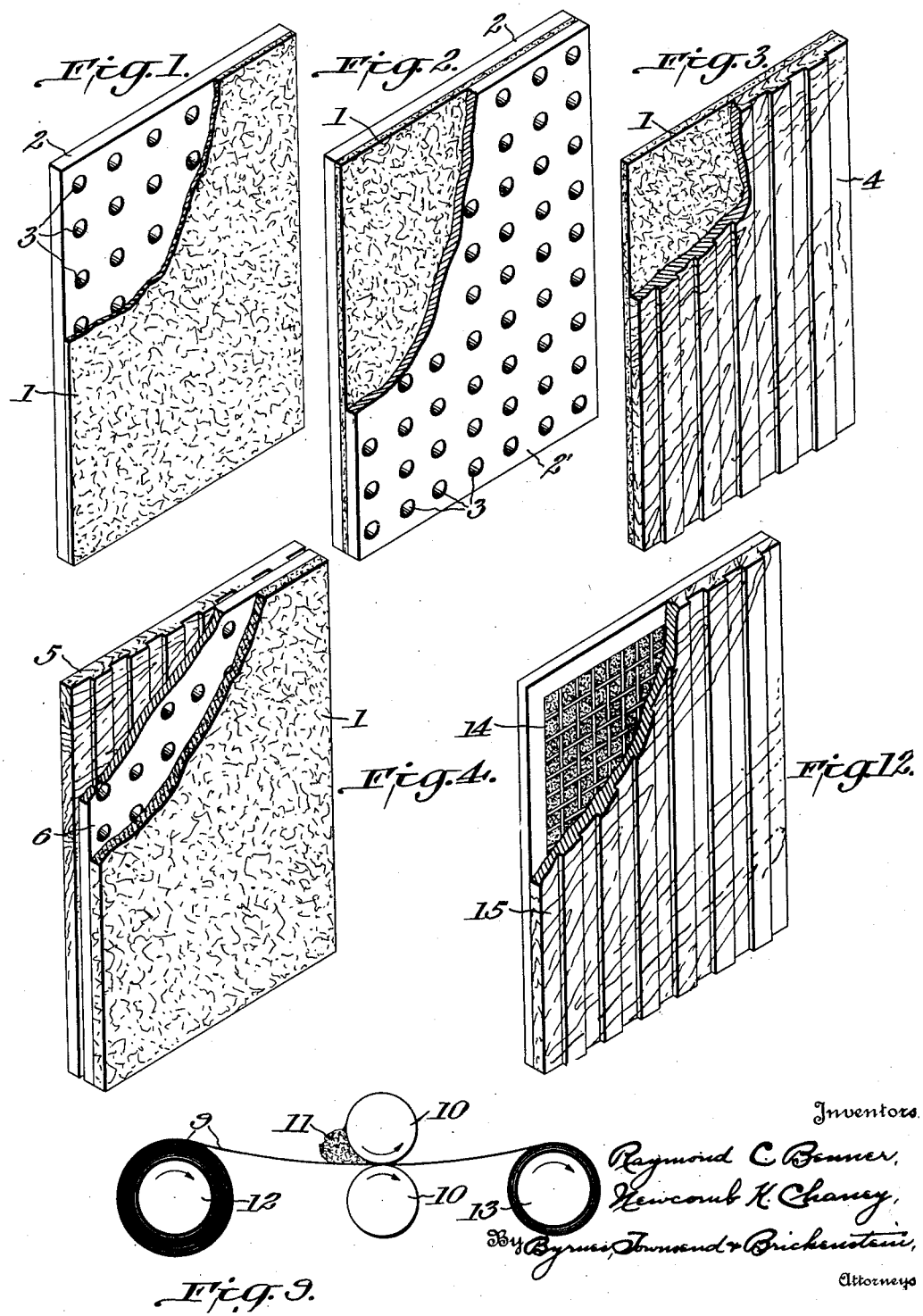

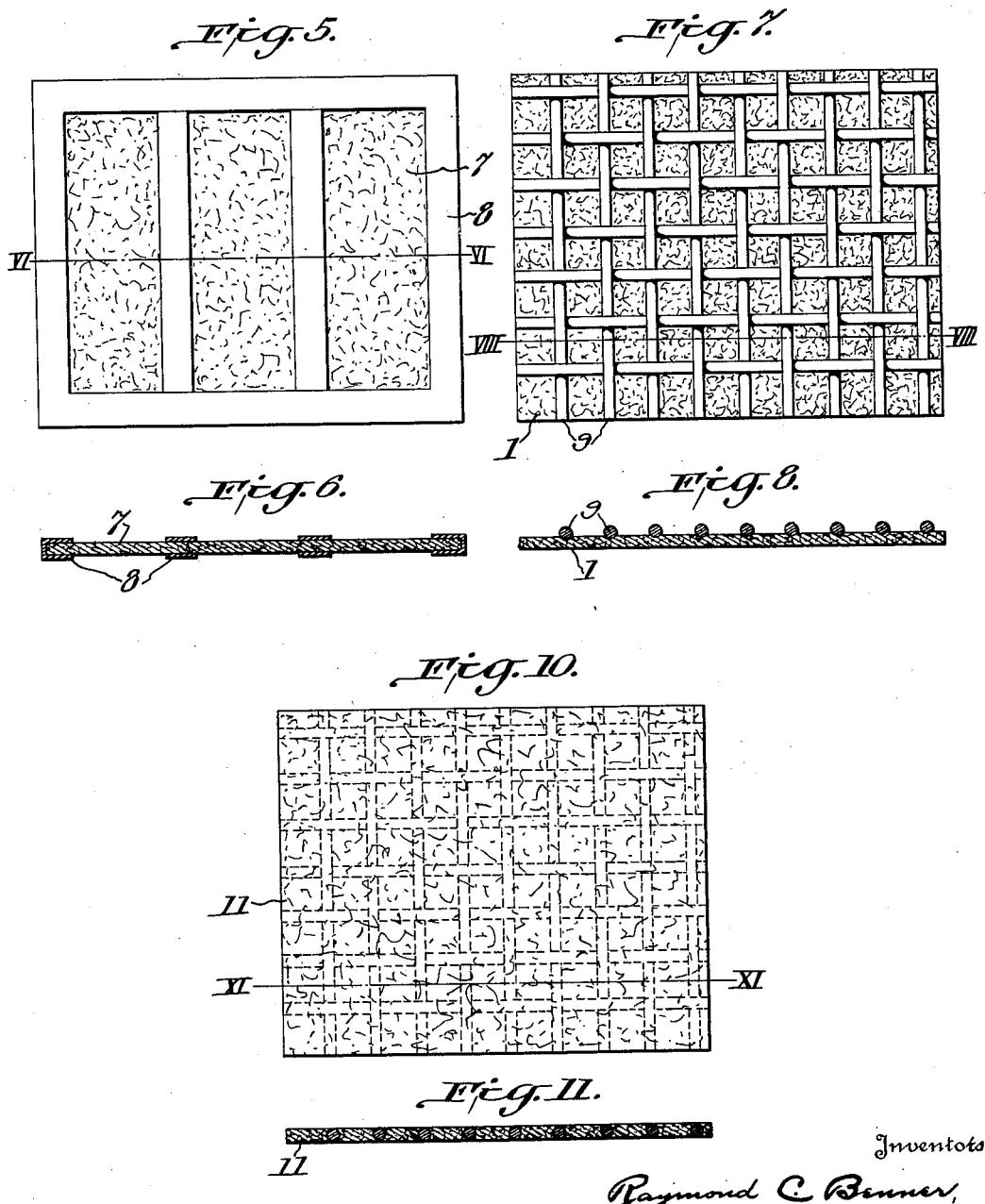

Patented Dec. 23, 1930

1,786,328

UNITED STATES PATENT OFFICE

RAYMOND C. BENNER, OF BAYSIDE, AND NEWCOMB K. CHANEY, OF KEW GARDENS, NEW YORK, ASSIGNORS, BY MESNE ASSIGNMENTS, TO PREST-O-LITE STORAGE BATTERY CORPORATION, A CORPORATION OF INDIANA

COMPOSITE SEPARATOR AND PROCESS OF MAKING THE SAME

Application filed September 8, 1923. Serial No. 661,677.

This invention relates primarily to improvements in separators for storage batteries of the lead-sulfuric acid type. The principal object of the invention is to provide strong composite separators resistant to oxidation, acid-corrosion, and other adverse influences. This object is attained by combining bonded fiber, of a type to be described, with supporting means.

The bonded fiber used in the present constructions is preferably unwoven material held together by a plastic binder, such as rubber, or by a mineral cementitious body of the type of gelatinous silicic acid. Separators comprising bonded fiber are not objectionably attacked by sulfuric acid electrolyte and they may be placed directly against the positive plate without undergoing oxidation. They are further characterized by multitudinous pores, formed by the felted mass of fibers. Through these pores electrolyte readily passes. The pores are, however, owing to their tortuous nature, substantially impermeable by crystal growths or particles of dislodged active material.

Bonded fiber may be prepared by impregnating fiber with a rubber solution, as more fully described in applications of R. C. Benner, Serial Nos. 557,906, filed May 2, 1922, Patent No. 1,500,220, dated July 8, 1924; 601,411, filed November 16, 1922; 628,375, filed March 28, 1923, Patent No. 1,628,104, May 10, 1927; 628,376, filed March 28, 1923, Patent No. 1,495,568, May 27, 1924; 628,843, filed March 30, 1923, Patent No. 1,677,512, July 17, 1928; 651,164, filed July 12, 1923, Patent No. 1,744,256, Jan. 21, 1930. Separators comprising silica-bonded fiber are described in applications of R. C. Benner, Serial No. 530,943, filed January 21, 1922, Patent No. 1,573,369, Feb. 16, 1928, and 593,427, filed October 9, 1922, Patent No. 1,653,614, Dec. 27, 1929.

In accordance with the present invention, bonded fiber is used in combination with supporting means, such as sheets or strips of rubber or wood, woven fabrics, or the like.

Reference is to be made to the accompanying drawings, in which

Fig. 1 is a perspective view partly broken away, showing a bonded fiber separator in combination with perforated sheet material;

Fig. 2 is a similar view of a construction in which two perforated sheets are used;

Fig. 3 is a perspective view, partly broken away, showing a bonded fiber separator in combination with a ribbed wooden separator;

Fig. 4 is a similar view, a perforated rubber separator being also used;

Fig. 5 is a side elevation of a bonded fiber separator marginally and transversely reinforced by plastic material;

Fig. 6 is a horizontal section on line VI—VI, Fig. 5;

Fig. 7 is an enlarged view showing bonded fiber supported by a fabric;

Fig. 8 is a horizontal section on line VIII—VIII, Fig. 7;

Fig. 9 is a diagrammatic illustration of an apparatus for making fabric-supported separators;

Fig. 10 is an enlarged view showing a reticular sheet having its meshes obstructed with bonded fiber;

Fig. 11 is a horizontal section on line XI—XI, Fig. 10; and

Fig. 12 is a perspective view, partly broken away, of a marginally reinforced fabric-bonded fiber separator in combination with a ribbed wooden separator.

Referring to Figs. 1 and 2, reference numeral 1 denotes a sheet of bonded fiber abutting against a plate 2, which may be of hard rubber or the like, and has perforations 3. Bonded fiber sheet 1 may be made very thin without substantial loss of its advantages. The plate 2 provides the requisite strength and rigidity, which are difficultly obtainable when bonded fiber is used alone. If a very high degree of rigidity is required, an additional plate 2' may be placed against the exposed face of the bonded fiber sheet, as in Fig. 2.

The perforations in the plates 2 and 2' may be large, as the bonded fiber sheet prevents passage of active material. Any other suitable form of opening through the plates may be substituted for the round perforations illustrated.

The bonded fiber sheet may advantageously be placed against the positive active material to serve as an "armor", preventing displacement of the material. Armored plate constructions are described and claimed in application Serial No. 650,165, filed July 7, 1923, by R. C. Benner. There is generally but little tendency of the negative active material to scale and crumble. However, in composite separators to be described later means are provided for armoring both negative and positive plates.

The parts of the composite separators described herein may be secured together, if desired, to facilitate assembly of the battery. Mechanical fastening means may be used, but we prefer an adhesive. This may be insoluble in acid electrolyte, or soluble, if without injurious effect on the battery. Water-soluble silicates are suitable adhesives for this purpose. Bonded fiber in loose condition, as well as in sheet form, may be secured to a supporting member by means of an adhesive.

In the form of the invention illustrated in Fig. 3, bonded fiber sheet 1 is used in combination with a separator 4, preferably ribbed, and formed of wood or fabricated cellulosic material having the general characteristics of wood. The bonded fiber sheet may be placed against the plane surface of the wood or equivalent separator, which then furnishes adequate support. The bonded fiber sheet will be placed in contact with the positive. Since the wooden separator is shielded to a large extent by the bonded fiber from oxidizing influences, it stands up during a long service period.

When it is desired to "armor" the negative electrode also, this may be done by arranging a ribbed wooden separator 5 with its plane face outward with respect to bonded fiber sheet 1. A perforated plate 6, of hard rubber or the like, is placed between the ribbed face of the separator and the sheet 1, as shown in Fig. 4. Contact with the negative active material does not hasten the deterioration of the wooden separator, and its plane face may be placed directly against that material.

Plate 6 might be omitted from the construction of Fig. 4, but in that case the ribbed surface of the wooden separator 5 would not completely support the bonded fiber sheet. Wooden separators having both sides plane may be used, but it is generally desirable to provide circulation channels by means of ribs, fluting, or the like.

The form of the invention illustrated in Figs. 5 and 6 comprises a sheet 7 of bonded fiber reinforced by members of plastic material so applied as to become substantially an integral part of the sheet. For example, soft rubber strips 8 may be applied to the face of the sheet and around its margins, and vulcanized there, pressure being applied to cause the bonded fiber and the reinforcing strips to coalesce. If rubber-bonded fiber is used, it may be vulcanized at the same time as the strips. Frames of adequate strength to support thin bonded fiber sheets may be readily formed in this general manner.

The bonded fiber sheets might be merely set in supporting frames, as in prior composite separators not comprising bonded fiber. However, better results are obtained by the substantially integral construction described.

Referring to Figs. 7 and 8, reinforcing means, such as fabric 9, may be partly or wholly embedded in the bonded fiber sheet 1. The fabric is preferably a loosely woven cellulosic material, which may be impregnated with rubber or some other acid-resistant substance having equivalent properties. The fabric serves as stiffening means and protects the bonded fiber from abrasion caused by vibration of the plates.

Alternately, bonded fiber in loose condition instead of in sheets may be forced into the meshes of open-weave fabric. The fabric and fiber may be passed together between rolls, or other suitable compression means may be adopted.

Fig. 9 illustrates diagrammatically one form of apparatus which may be advantageously used. Rollers 10 compress bonded fiber 11 upon the fabric 9, which is drawn from drum 12 and wound upon drum 13. The fiber may be merely piled adjacent the intake side of the rollers 10, as shown, or may be fed in any other suitable way.

Figs. 10 and 11 illustrate a fabric-supported separator of this general type, comprising bonded fiber 11.

The fiber may also be applied in a substantially continuous sheet, within and upon the fabric, by a felting process analogous to that used in the manufacture of paper. For example, the fabric may be laid flat in the bottom of a sieve, into which a suspension of fiber in liquid is poured. The liquid drains off, leaving the fiber interlocked with the fabric and forming a satisfactory separator sheet. Vulcanization, addition of reinforcing ribs, or other desirable additional steps may follow the deposition of the fiber.

Separators of the types shown in Figs. 7, 8, 10, and 11, may be used alone or with any suitable additional reinforcing means, such as the perforated plates, wooden sheets, or integral frames previously described. Fig. 12 shows, by way of example, a fabric-bonded, marginally reinforced fiber separator 14 in combination with a ribbed wooden separator 15. Instead of fabric, other suitable reticulated material may be used, for example a grid-like structure of rubber.

It has heretofore been proposed to reinforce with integral ribs separators formed by severing blocks composed of layers of fabric embedded in rubber. Such blocks are severed along planes perpendicular to the plane of the fabric, and fabric threads therefore extend rectilinearly through the resulting sheets. In the present composite and reinforced separators, on the contrary, the bonded fibers are not straight. They provide tortuous passages substantially impermeable by active material, and an essential feature of the present invention is the utilization of this novel and advantageous characteristic in combination with supporting means. Various embodiments of the invention, other than those specifically described and illustrated herein, may be made within the scope of the appended claims.

We claim:

1. A composite separator comprising a sheet of bonded fiber arranged in a diversiform manner to form tortuous passages for the electrolyte through the sheet, a supporting body comprising a wooden separator having its outer face shaped to provide circulation channels, said supporting body being pervious to electrolyte, one face of said separator abutting against and joined to a plane surface of said supporting body.

2. A composite separator comprising fabric embedded in bonded fiber.

3. A composite separator comprising a sheet of bonded fiber having reinforcing strips encasing its margins and at least in part integrally connected with the sheet.

4. The invention according to claim 3, in which rubber-bonded fiber and rubber reinforcing strips are used.

5. Process of making separators, comprising forcing bonded fiber and fabric together by compression means.

In testimony whereof, we affix our signatures.

RAYMOND C. BENNER.
NEWCOMB K. CHANEY.